US010280098B2

(12) United States Patent
Parkansky et al.

(10) Patent No.: US 10,280,098 B2
(45) Date of Patent: May 7, 2019

(54) SUBMERGED ARC REMOVAL OF CONTAMINANTS FROM LIQUIDS

(71) Applicant: Clear Wave Ltd., Herzliya (IL)

(72) Inventors: Nahum Parkansky, Raanana (IL);
Reuven Lev Boxman, Herzliya (IL);
Simon Evelina Faktorovich, Herzliya (IL); Boris A. Alterkop, Tel Aviv (IL);
Olga Berkh, Haifa (IL); Adi Vegerhof, Ganey Tikva (IL)

(73) Assignee: Clear Wave Ltd., Herzliya (IL)

( * ) Notice: Subject to any disclaimer, the term of this patent is extended or adjusted under 35 U.S.C. 154(b) by 1117 days.

(21) Appl. No.: 14/365,641

(22) PCT Filed: Dec. 3, 2012

(86) PCT No.: PCT/IB2012/056916
§ 371 (c)(1),
(2) Date: Jun. 16, 2014

(87) PCT Pub. No.: WO2013/088291
PCT Pub. Date: Jun. 20, 2013

(65) Prior Publication Data
US 2015/0001164 A1   Jan. 1, 2015

Related U.S. Application Data

(60) Provisional application No. 61/570,846, filed on Dec. 15, 2011.

(51) Int. Cl.
*C02F 1/48* (2006.01)
*C02F 1/46* (2006.01)
(Continued)

(52) U.S. Cl.
CPC ........ *C02F 1/4608* (2013.01); *C02F 1/46109* (2013.01); *C02F 1/722* (2013.01);
(Continued)

(58) Field of Classification Search
CPC .. C02F 1/4608; C02F 1/722; C02F 2101/308; C02F 1/46109; C02F 2201/4615;
(Continued)

(56) References Cited

U.S. PATENT DOCUMENTS 3,359,422 A * 12/1967 Pollock ................. H01J 27/08
376/145
5,630,915 A    5/1997 Greene et al.
(Continued)

FOREIGN PATENT DOCUMENTS

CA      2942402 A1   10/2015
CN    105481047 A    4/2016
(Continued)

OTHER PUBLICATIONS

Parkansky N. et al "Submerged Arc Breakdown of Sulfadmethoxine (SDM) in Agueous Solutions" in Plasma Chem, Plasma Process, 2008 vol. 28, Issue 5, pp. 583-592. http://www.hydrochem.tau.ac.il/wp-content/uploads/pdf9.pdf.

(Continued)

*Primary Examiner* — Walter D. Griffin
*Assistant Examiner* — Cameron J Allen
(74) *Attorney, Agent, or Firm* — Simon Kahn; Chanoch Kahn

(57) ABSTRACT

To remove a contaminant from a liquid, a pulsed electrical arc discharge is effected between two electrodes immersed in the liquid, thereby creating a plurality of particles within the liquid. One or both of the electrodes is metallic, for example iron or titanium. Before the pulsed electrical arc discharge is terminated, another step that promotes destruction of the contaminant by particles, such as removing the particles from the liquid or adding an oxidizer to the liquid, is performed. In the case of the extra step being adding an oxidizer to the liquid, preferably the termination of the (Continued)

pulsed electrical arc discharge is followed by allowing the liquid and the particles therein to age.

22 Claims, 4 Drawing Sheets

(51) Int. Cl.
| | |
|---|---|
| H05H 1/48 | (2006.01) |
| C02F 1/461 | (2006.01) |
| C02F 1/72 | (2006.01) |
| C02F 1/00 | (2006.01) |
| C02F 101/30 | (2006.01) |

(52) U.S. Cl.
CPC ............... H05H 1/48 (2013.01); C02F 1/001 (2013.01); C02F 2101/308 (2013.01); C02F 2201/46 (2013.01); C02F 2201/4615 (2013.01); C02F 2201/4618 (2013.01); C02F 2201/46175 (2013.01); C02F 2305/026 (2013.01)

(58) Field of Classification Search
CPC .... C02F 2201/46175; C02F 2201/4618; C02F 2201/46; C02F 2305/026; C02F 1/001; H05H 1/48
See application file for complete search history.

(56) References Cited

U.S. PATENT DOCUMENTS

| | | | | |
|---|---|---|---|---|
| 8,480,963 | B2* | 7/2013 | Bryden | C02F 1/4608 422/186.27 |
| 2004/0084382 | A1* | 5/2004 | Ryazanova | C01B 13/11 210/748.11 |
| 2007/0080054 | A1* | 4/2007 | Parkansky | B01J 8/005 204/164 |
| 2007/0227904 | A1* | 10/2007 | Miller | B01D 61/422 205/742 |
| 2012/0034131 | A1* | 2/2012 | Rubinsky | A23B 4/012 422/22 |
| 2015/0001164 | A1 | 1/2015 | Parkansky et al. | |

FOREIGN PATENT DOCUMENTS

| | | |
|---|---|---|
| GB | 892628 | 3/1962 |
| JP | 10323674 | 12/1988 |
| JP | 2013049015 A | 3/2013 |
| KR | 20010047773 A | 6/2001 |
| RU | 2286951 | 10/2006 |
| WO | 2016151970 A1 | 9/2016 |

OTHER PUBLICATIONS

Boxman R.L et al, "Submerged Arc Breakdown of Methylene Blue in Agueous Solutions", In proceedings of the 20th International Symposium of Plasmna Chemistry, Philadelphia—USA, Jul. 24-29, 2011 ,retrieved in www.ispc-conference.org/ispcproc/ispc20/301. pdf.
Parkansky N. et al, "Submerged Arc Breakdown of Methylene Blue in Aqueous Solutions" in Plasma Chem , Plasma Process 2012, VOI 32, Issue 5 pp. 1572-8986 pp. 933-947.
Sugiato A. T et al "Pulsed plasma processing of organic compounds in aqueous solution", thin Solid Films 2001, vol. 386, Issue 2 , pp. 295-299, May 15, 2001.
Yiyong Wen, Jianping Yi, Shen Zhao, Song Jiang, Yuming Chi, Kefu Liu, "Non-thermal plasma treatment of Radix aconiti wastewater generated by traditional Chinese medicine processing", published Jan. 16, 2016 (Jan. 16, 2016) by Journal of Environmental Sciences 44 (2016) 99-108, www.sciencedirect.com.
Sonia Muradia, Masaaki Nagatsu, "Low-voltage pulsed plasma discharges inside water using a bubble self-generating parallel plate electrode with a porous ceramic" Published Apr. 11, 2013 (Apr. 11, 2013), Published by the American Institute of Physics, ttp://dx.doi.org/10.1063/1.4799652.
Tiecheng Wang, Guangzhou Qu, Qiuhong Sun, Dongli Liang, Shibin Hu, "Evaluation of the potential of p-nitrophenol degradation in dredged sediment by pulsed discharge plasma", Published on Jul. 16, 2015 (Jul. 16, 2015), Water Research 84 (2015) 18e24, www.elsevier.com/locate/watres.
Shintaro Kodama, Satoru Matsumoto, Douyan Wang, Takao Namihira, Hidenori Akiyama, "Treatment of persistent organic pollutants in wastewater by nano-seconds pulsed discharge Plasma". 2015 IIAI 4th International Congress on Advanced Applied Informatics.
Parkansky N, Vegerhof A, Alterkop B, Berkh O, Boxman RL, "Submerged arc breakdown of methylene blue in aqueous solutions.", Plasma Chem Plasma Process 32:933-947, 2012.
Parkansky N, Alterkop BA, Boxman RL, Mamane H, Avisar D, "Submerged arc breakdown of sulfadimethoxine (SDM) in aqueous solutions", Plasma Chem Plasma Process 28:583-592. Published online Jul. 9, 2008. Springer Science+Business Media, LLC 2008.
Parkansky N, Simon EF, Alterkop BA, Boxman RL, Berkh O , "Decomposition of Dissolved methylene blue in water using a submerged arc between titanium electrodes." PPlasma Chem Plasma Process (2013) 33:907-919. DOI 10.1007/s11090-013-9465-5 Published online: Jun. 23, 2013 Springer Science+Business Media New York 2013.
N. Parkansky, V.Yakubov, E. Faktorovich-Simon, B. Alterkop, R.L. Boxman, O. Berkh, "Removal of methylene blue from aging water solutions treated by a submerged arc", Plasma Chem Plasma Process (2014) 34:745-754. DOI 10.1007/s11090-014-9532-6. Published online: Feb. 15, 2014 Springer Science+Business Media New York 2014.
B.R. Locke, M. Sato, P.Sunka, M.R. Hoffmann, J.-S. Hang, "Electrihydraulic discharge and nonthermal plasma for water treatment", Ind. Eng. Chem. Res. 2006, 45, 882-905, Published on Web. Mar. 12, 2005. (Dec. 3, 2015).
H.S. Uhm, J.P. Lim, S.Z .Li, "Sterilization of bacterial endospores by an atmospheric-pressure argon plasma jet". Appl. Phus.Let. 90, 261501 (2007), Published on line Jun. 27, 2007 (Jun. 27, 2007).
Magureanu M, Piroi D, Mandache NB, and Parvulescu V, "Decomposition of methylene blue in water using a dielectric barrier discharge: Optimization of the operating parameters", (2008) Journal of Applied Physics 104: 103306 , published online Nov. 20, 2008.
Angeloni D-M, Dickson S-E, Emelko M-B, Chang J-S, "Removal of Methyl-tert-butyl Ether from Water by a Pulsed Arc Electrohydraulic Discharge System", (2006) Jpn J Appl Phys 45(10B):8290-8293, published online Oct. 24, 2006.
Ariel Meirovich, "Submerged pulse arc treatment of water with organic compound methylene blue" Electrical Discharge and Plasma Laboratory , Feb. 5, 2014, Poster, Tel Aviv, Israel.
Ariel Meirovich, Naum Parkansky, Raymond L. Boxman, Olga Berkh, Zahava Barkay, Yuri Rosenberg, "Treatment of Methylene Blue Water solution by Submerged Pulse Arc in Multi-electrode Reactor", Feb. 2015, Poster, Barcelona, Spain.
Ariel Meirovich, Naum Parkansky, Reuven Boxman, "Treatment of Methylene Blue Water solution by Submerged Pulse Arc in Multi-electrode Reactor" Electrical Discharge and Plasma Laboratory, 10.1016/j.jwpe.2016.08.002, Aug. 11, 2016, Paper, Journal of Water Process Engineering.
Ariel Meirovich, Naum Parkansky, Reuven Boxman, Olga Berkh, "Possibilitly of Submerged Pulse Arc Treatment of Wastewater with Organic Contaminates in Multi-electrode Reactor", Mar. 2, 2016, Poster, Beer Sheva, Israel.

\* cited by examiner

US 10,280,098 B2

SUBMERGED ARC REMOVAL OF CONTAMINANTS FROM LIQUIDS

FIELD AND BACKGROUND OF THE INVENTION

The present invention relates to the removal of contaminants from liquids such as water and, more particularly, to the removal of such contaminants by pulsed submerged arc electrical discharges.

Biologically active molecules of diverse sorts may contaminate water and technology is sought for their removal. One example of a class of contaminants is dyes used in textile, leather, food processing, cosmetics, paper, and dye manufacturing industries. Many dyes and their breakdown products are toxic. It is desirable to remove contaminants from effluent water in manufacturing facilities before the water is discharged into the environment. Due to the aromatic rings present in the dye molecules, conventional biological treatment does not effectively eliminate these molecules.

Submerged arc discharge is an effective method of removal of biologically active molecules from liquids such as water. The submerged arc (SA) is a high current electrical discharge between two electrodes submerged in a liquid such as water. The arc produces plasma, which in turn generates ultra-violet radiation and very active oxidant species, such as (in the case of the liquid being water) OH radicals, which can destroy biologically active molecules.

It has been shown that plasma technologies can treat water. Several mechanisms including radical reactions, shock waves, ultra-violet radiation, ionic reactions, electron processes and thermal dissociation are thought to be responsible for the treatment (Locke B-R, Sato M, Sunka P, Hoffmann M-R, Chang J-S (2006) *Ind Eng Chem Res* 45: 882-905; Parkansky N, Alterkop B A, Boxman R L, Mamane H, Avisar D (2008) *Plasma Chem Plasma Process* 28:583-592; Travis J (1994) *Science* 264:360-362;). It is suspected that these mechanisms, singularly or synergistically, may be responsible for concurrently oxidizing trace contaminates and disinfecting. In particular, the submerged pulsed high-current and high voltage electrical discharge between two electrodes in a liquid, sometimes referred to as an electro-hydraulic discharge [Locke B-R, Sato M, Sunka P, Hoffmann M-R, Chang J-S (2006) *Ind Eng Chem Res* 45: 882-905], has been shown to oxidize many organic compounds such as methyl-tert-butyl ether (MTBE) [Angeloni D-M, Dickson S-E, Emelko M-B, Chang J-S (2006) *Jpn J Appl Phys* 45(10B):8290-8293], atrazine [Leitner N-K-V, Syoen G, Romat H, Urashima K, Chang J-S (2005) *Water Res* 39:4705-4714], phenol [Sun B, Sato M, Clements J-S (2000) *Environ Sci Technol* 34:509-513] and chlorobenzene [Liu Y, Jiang X (2008) *Plasma Chem Plasma Process* 28:15-24]. The electrodes were constructed from graphite, because carbon is generally biocompatible, and iron, because of the possibility of producing Fenton's reagent ($H_2O_2$, $Fe^{2+}$), which very effectively oxidizes organic compounds [Tzedakis T, Savall A, Clifton M J (1989) *J Appl Electrochem* 19:911-921], and because any iron micro- or nano-particles which are inevitably produced can be removed magnetically [Chang J-S, Urashima K, Dickson S and Emelko M. B. S (2008) in: Guceri S, Fridman A (eds) *Plasma Decontamination: Plasma Assisted Decontamination of Biological and Chemical Agents*, Springer New York: 87-97]. Although electro-hydraulic discharge systems have been studied for many years, their use in water treatment applications is rather recent and remains to be optimized for various types of contaminants and microorganisms. In contrast to these high voltage systems, a low voltage arc applied between two submerged carbon electrodes was used to breakdown sulfadimethoxine in aqueous solutions [Parkansky N, Alterkop B A, Boxman R L, Mamane Avisar D (2008) *Plasma Chem Plasma Process* 28:583-592]. All these prior art submerged arc techniques also erode particles from the electrodes that may interfere with the process and contaminate the treated water, and should be removed.

It would be highly advantageous to have a method of removing contaminants from liquids by pulsed submerged electrical arc discharge in which the eroded particles do not interfere with the process. Ideally, the eroded particles would actually enhance the process.

There are many patents that relate to submerged arc plasma systems for purifying and sterilizing food, beverages and water.

For example, U.S. Pat. No. 6,787,105 to Robbins, titled "Process and apparatus for reduction of microorganisms in a conductive medium using low voltage pulsed electrical energy", relates to the reduction of microorganisms in a conductive medium by subjecting the medium to low voltage pulsed electrical energy generated by pair of electrodes contacting the medium.

U.S. Pat. No. 4,917,785 to Juvan, titled "Liquid processing system involving high-energy discharge", describes the use of a plasma arc for sterilizing, with an electrode replacement means for enabling replacement of the electrodes as they are eroded from the electrical discharge, and using a vortex to precipitate solids. U.S. Pat. No. 4,957,606 to Juvan, titled "Separation of dissolved and undissolved substances from liquids using high energy discharge initiated shock waves", describes a system for applications including the destruction of toxic wastes and sewage treatment, precipitation of chemical compounds and elements including metals from solution (brine, sea water, industrial waste), sterilization and water purification, catalytic formation of chemical compounds, and processing of hydrocarbons.

SUMMARY OF THE INVENTION

According to the present invention there is provided a method of removing a contaminant from a liquid including: (a) immersing two electrodes, at least one of which is metallic, in the liquid; (b) effecting a pulsed electrical arc discharge between the electrodes while the electrodes are immersed in the liquid, thereby creating a plurality of particles within the liquid; and (c) performing at least one other step, prior to a termination of the effecting of the pulsed electrical arc discharge, to promote destruction of the contaminant by the particles.

According to the present invention there is provided a system for removing a contaminant from a liquid, including: (a) two electrodes, at least one of which is metallic; (b) a mechanism for effecting a pulsed electrical arc discharge between the electrodes when the electrodes are immersed in the liquid; and (c) a mechanism, separate from the two electrodes and from mechanism for effecting the pulsed electrical arc discharge, for promoting destruction of the contaminant by particles that are created within the liquid by the pulsed electrical arc discharge prior to a termination of the effecting of the pulsed electrical arc discharge.

According to the basic method of the present invention, two electrodes are immersed in a liquid such as water that is to be decontaminated. One or both of the electrodes is/are metallic. A pulsed electrical arc discharge is effected, either continuously or intermittently, between the two electrodes while the two electrodes are immersed in the liquid. The pulsed electrical arc discharge creates a plurality of particles within the liquid. Before the effecting of the pulsed electrical arc discharge is terminated, at least one other step, for example removing the particles from the liquid, for example by filtration, or adding an oxidant such as hydrogen peroxide to the liquid, for promoting destruction of the contaminant, also is performed. As discussed below, newly created particles tend to promote destruction of the contaminant but, depending on the composition of the electrodes, older particles may tend to inhibit destruction of the contaminant. Removing such older particles from the liquid allows subsequently newly created particles to continue to promote destruction of the contaminant.

Although the description below of the preferred embodiments of the present invention is in terms of the application of the present invention to water-based liquids, the present invention also is applicable to the decontamination of other liquids (electrically conducting or insulating) if contact electrodes are used to initiate the pulsed electrical arc discharge.

Preferred metals for inclusion in the metallic electrode(s) include iron and titanium.

Optionally, the effecting of the pulsed electrical discharge includes vibrating one of the electrodes.

Preferred filtration methods include filtering through a filter whose pore size is between about 0.2 microns and about 0.8 microns, filtering through sand, filtering via a flotation filter and filtering via an electro-flotation filter.

In embodiments in which the effecting of the pulsed electric arc discharge is intermittent, the filtration preferably is performed between applications of the pulsed electrical arc discharge. The pulsed electrical arc discharge and the filtration are alternated until the concentration of the contaminant in the liquid falls below a predetermined level.

The preferred oxidizer is hydrogen peroxide. Most preferably, sufficient hydrogen peroxide is added to the liquid to produce a concentration of hydrogen peroxide, in the liquid, between about 0.01% and about 0.5%.

Preferably, in embodiments in which an oxidizer is added to the liquid before the effecting of the pulsed electric arc discharge is terminated, the effecting of the pulsed electric arc discharge is followed by allowing the liquid together with the particles therein to age for a period of time sufficient for the concentration of the contaminant in the liquid to fall below a predetermined level. Then, the particles are removed from the liquid, preferably by adding a coagulant to the liquid.

Preferred parameters for the pulsed electrical arc discharge include:

an energy per pulse of between about 0.1 mJ and about 1000 mJ (most preferably between about 2.5 mJ and about 22.5 mJ);

a pulse duration between about 0.1 microseconds and about 1 microsecond;

a pulse frequency between about 1 Hz and about 10 KHz (most preferably between about 100 Hz and about 10 KHz);

a voltage between about 30 V and about 400 V;

a current between about 1 A and about 500 A.

The scope of the present invention also includes a system for performing the method of the present invention.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of purification of a liquid by pulsed electrical arc discharge according to the present invention may be better understood with reference to the drawings and the accompanying description.

As discussed above in the "field and background" section, laboratory experiments have demonstrated that a pulsed low voltage submerged arc effectively removes the biologically active molecules from water. A low voltage arc applied between two submerged carbon electrodes has been used to breakdown sulfadimethoxine and microorganisms in aqueous solutions. These laboratory experiments demonstrated that a pulsed low voltage submerged arc effectively removes the biologically active molecules from water.

A single pulse discharge with iron electrodes has been found to be more effective than a similar discharge with carbon electrodes. However, iron particles in the range of 100 nm to micrometer diameter are ablated from the electrodes. These reduce the level and rate of further removal of organic species, evidently poison the reaction and prevent further reaction.

An aspect of the present invention addresses this issue and describes a more effective technique for removing contaminant molecules from water, by exposing the water volume to a submerged arc between iron-based electrodes, followed by filtration to remove the particles produced during the process. This procedure may be repeated as many times as needed to remove contaminant molecules to within acceptable concentrations. The optimum processing time for the arcing and the particle removal parts of the cycle and the number of cycles to maximize the purification rate and to obtain acceptable levels of decontamination may be determined empirically.

Figure 1:
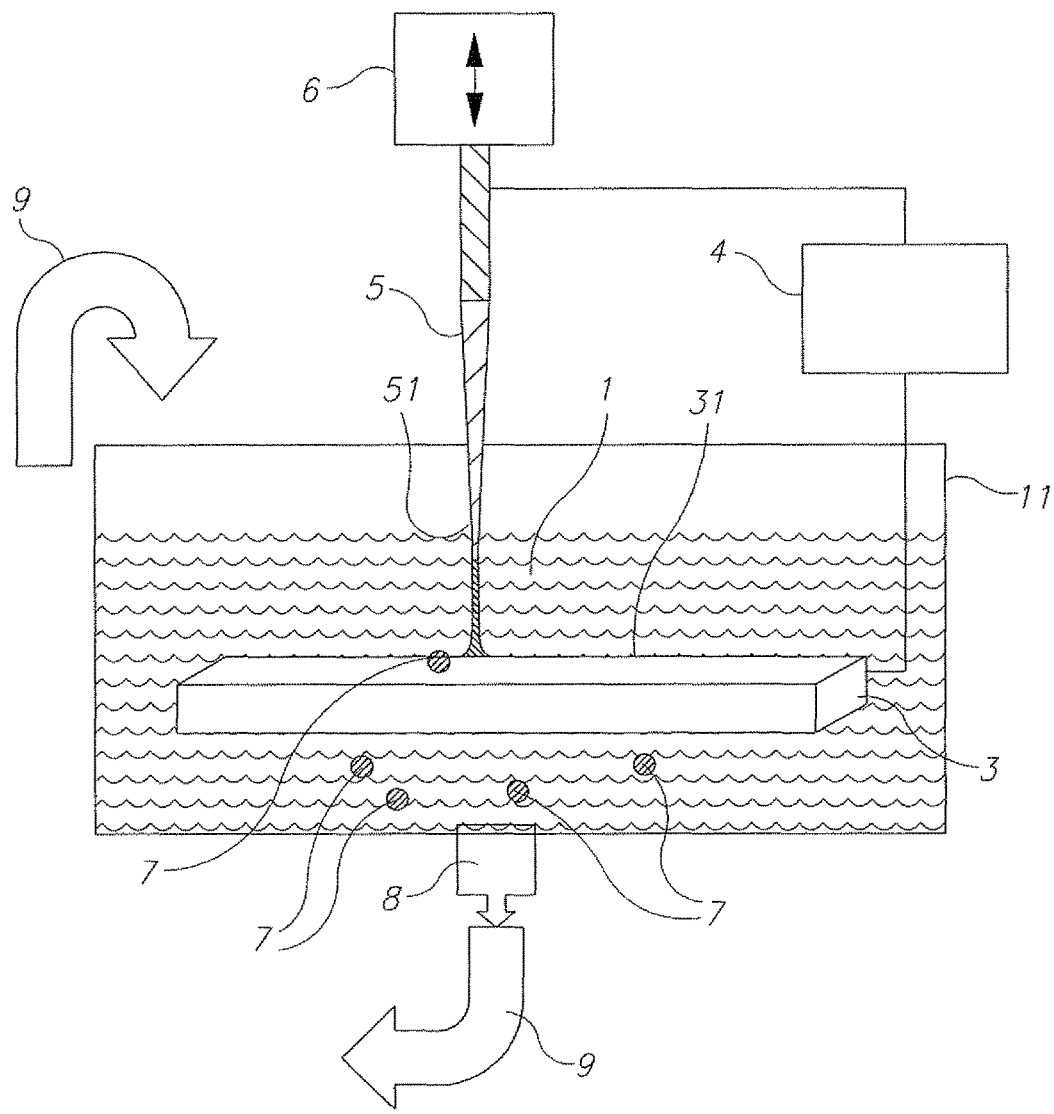
FIGS. 1 and 4 illustrate experimental systems for removing organic contaminants from a liquid sample using submerged pulsed electric arc discharges.

Referring now to the drawings, FIG. 1 illustrates an experimental system for removing organic contaminants from a liquid sample 1. A quantity of liquid 1 to be treated is placed in a suitable vessel 11 including iron based electrodes 3, 5, one electrode 3 being a stationary electrode and the other electrode 5 being a vibrated electrode 5. An actuator 6 is provided to ignite a discharge produced by pulse generator 4. A filter 8 is provided to remove particle contaminants 7 that are ablated from the electrodes 3, 5.

Actuator 6 is used to ignite the discharge by an axial motion of vibrating electrode 5 with respect to the surface 31 of the stationary electrode 3. In this manner, a pulsed arc discharge 2 is produced between the surface 31 of stationary electrode 3 and the surface 51 of vibrated electrode 5. The electrical pulses used to sustain the arc discharge are produced by the pulse generator 4. In this embodiment, the mechanism to ignite the discharges is axial motion of electrode 5 with respect to surface 31 using an actuator 6. Electrode 5 periodically makes contact, and quickly breaks contact with surface 31. Current starts to flow when (or slightly before) electrode 5 contacts surface 31, and the current continues flowing through the arc plasma which is created when the contact is broken. The pulsed arc discharge 2 is ignited between the electrodes 3, 5 and sustained for a pre-determined pulse period, $T_p$. The pulses are repeated at the vibration frequency f determined by actuator 6, for a treatment time $T_t$.

With appropriate pulse parameters and materials, the arc produces a plasma that includes material from electrodes 3 and 5, and the surrounding environment. These materials may condense in the treated liquid sample 1 in the form of micro or nano-particles 7. After $T_t$, the treated liquid sample 1 is filtered by filter 8 and re-fed into vessel 11 (illustrated schematically by arrow 9) for re-treatment.

Figure 3:
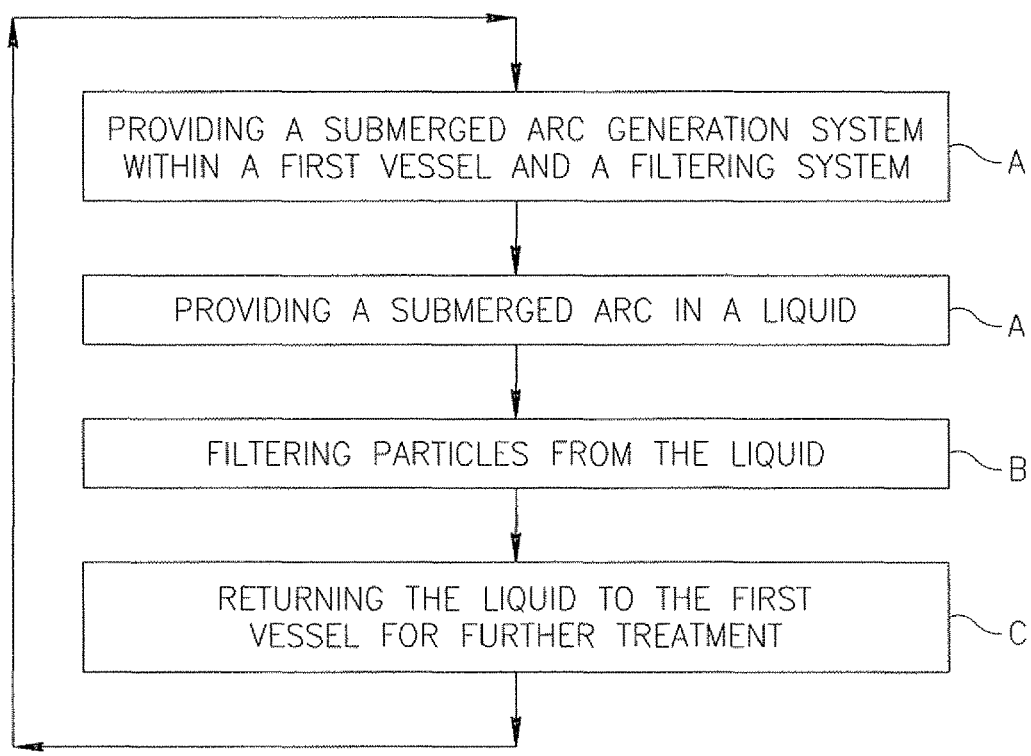
FIG. 3 is a flow chart of a method of using the system of FIG. 1 to remove contaminants from a liquid sample.

With reference to FIG. 3, a method of decontamination comprises providing a decontamination unit, including:
(i) liquid to be treated;
(ii) a first vessel for containing the liquid during a submerged arc discharge;
(iii) a first electrode;
(iv) a second electrode;
(v) a pulse generator;
(vi) a filtering system, such as that shown in FIG. 1—Step A;
Effecting electrical discharge pulses between the stationary electrode and the vibrated electrode submerged in the liquid—Step B;
Filtering particles from the liquid—step C, and
Returning the liquid to the first vessel for further treatment—Step D.

Step D of repeating the stages of pulse plasma creation (Step B) and filtering (step C) is performed as many times as needed to reduce the concentration of organic contaminant molecules to acceptable levels.

The filtering system can feed back into the vessel of the submerged arc sub-system previously used or into a second submerged arc vessel downstream thereof.

$T_p$ may be chosen experimentally to maximize the removal rate, to minimize the removal cost, or to optimize some other parameter of interest.

Pulse generator 4 may be DC or AC. The pulse parameters such as the peak current, waveform, pulse duration and the repetition frequency may be varied over a wide range (30-400 V; 1-500 A; 1-10000 Hz). Such variation will generally influence the level, rate and effectiveness of contaminant molecule removal.

A vibrating electrode was used in the experimental set up as it advantageously enables usage of a low voltage power supply. It is, however, believed to create higher electrode erosion, thus their usage for this type of application is somewhat counterintuitive. Indeed, without the filtering that is an essential part of the invention and embodiments for which are detailed below, vibrating electrodes would generally be considered unacceptable.

In some embodiments where a high voltage power supply is available, both electrodes can be stationary. The arc may be initiated in such circumstances by applying a high voltage pulse, typically of about 7 kV, between the electrodes. It will be appreciated that stationary electrodes are advantageous as they allow a much simpler mechanical design for the system, however, there is thus a tradeoff, since the power supply required is more complicated and expensive.

Broadly speaking, there are two types of filter that may be used to separate particulate solids from fluids:
(i) Surface filters, in which particulates are captured on a permeable surface
(ii) Depth filters, in which particulates are captured within a porous body of material.

In addition, there are passive and active devices for causing solid-liquid separation such as settling tanks, self-cleaning screen filters, hydrocyclones and centrifuges.

The filtration technique of the present invention may use any of these techniques, and may be a standard filter, a sand filter, and/or may use a flotation or electro-flotation technology, it being appreciated that flotation or electro-flotation can effectively remove nano-particles from liquid 1.

There are several kinds of depth filter, some employing fibrous material and others employing granular materials. Sand bed filters are an example of a granular loose media depth filter. Sand bed filters are usually used to separate small amounts (<10 parts per million or <10 g per cubic meter) of fine solids (<100 micrometers) from aqueous solutions. In addition, sand bed filters are usually used to purify the fluid rather than capture the solids as a valuable material. Therefore they find most of their uses in liquid effluent (wastewater) treatment.

Sand bed filters work by providing the particulate solids with many opportunities to be captured on the surfaces of sand grains. As fluid flows through the porous sand along a tortuous route, the particulates come close to sand grains. The particulates can be captured by one of several mechanisms including direct collision, Van der Waals or London force attraction, static electrical charge attraction and diffusion.

Sand filters can be operated either with upward flowing fluids or downward flowing fluids. For downward flowing devices the fluid can flow under pressure or by gravity alone. Pressure sand bed filters tend to be used in industrial applications and often are referred to as rapid sand bed filters. Gravity fed units are used in water purification especially for providing drinking water and these filters have found wide use in developing countries (slow sand filters).

It will be appreciated that smaller sand grains provide more surface area and therefore a higher decontamination of the inlet water, but it also requires more pumping energy to drive the fluid through the bed. A compromise is that most rapid pressure sand bed filters use grains in the range 0.6 to 1.2 mm although for special applications other sizes may be specified. Larger feed particles (>100 micrometers) tend to block the pores of the bed and turn it into a surface filter that clogs rapidly. Larger sand grains can be used to overcome this problem, but if significant amounts of large solids are in the feed they need to be removed upstream of the sand bed filter by a process such as settling.

Guidance on the design of rapid sand bed filters suggests that they should be operated with a maximum flow rate of 9 $m^3/m^2$/hr. To maximize throughput, the depth of the sand may be around 0.6-1.8 m. Using the required throughput and the maximum flowrate, the required area of the bed can be calculated.

Particulate solids are not captured uniformly with depth. More particulates are captured higher up within the bed, with the concentration gradient decaying exponentially. Rapid pressure sand bed filters are typically operated with a feed pressure of 2 to 5 bar(a) (28 to 70 psi(a)). The pressure drop across a clean sand bed is usually very low. It builds as particulate solids are captured on the bed.

Rapid pressure sand bed filters capture particles down to very small sizes, and do not have a true cut off size below which particles always pass. Rather, the shape of the filter particle size-efficiency curve is a U-shape with high rates of particle capture for the smallest and largest particles and with a dip in-between for mid-sized particles.

The build-up of particulate solids causes an increase in the pressure lost across the bed for a given flow rate. For a gravity fed bed when the pressure available is constant, the flow rate falls. When the pressure loss or flow is unacceptable the bed is back washed to remove the accumulated particles. For a pressurized rapid sand bed filter this occurs when the pressure drop is around 0.5 bar. The back wash fluid is pumped backwards through the bed until the bed is fluidized and has expanded by up to about 30% (the sand grains start to mix and as they rub together they drive off the particulate solids). The smaller particulate solids are washed away with the back wash fluid and captured usually in a settling tank. The fluid flow required to fluidize the bed is typically 3 to 10 $m^3/m^2/hr$ but generally needs not run for more than a few minutes. Small amounts of sand can be lost in the back washing process and the bed may need to be topped up periodically.

All three methods are used extensively in the water industry throughout the world and one ordinarily skilled in the art will have no difficulty in designing an appropriate system for this type of application, depending on the scale of the plant. One advantage of slow sand filters is that they do not require chemical aids whereas other filter types require the use of flocculant chemicals to work effectively.

Passing flocculated water through a rapid gravity sand filter strains out the floc and the particles trapped within it, reduces the numbers of bacteria and removes most of the solids. The medium of the filter is sand of varying grades. Where taste and odor may be a problem (organoleptic impacts), the sand filter may include a layer of activated carbon to remove such taste and odor.

Proof of Concept

Methylene Blue MB is a heterocyclic aromatic chemical compound with the molecular formula $C_{16}H_{18}N_3SCl$. It has many uses in a range of different fields, such as biology and chemistry. At room temperature it appears as a solid, odorless, dark green powder that yields a blue solution when dissolved in water. The hydrated form has 3 molecules of water per molecule of methylene blue. Methylene blue is an organic dye stuff that is soluble in water and by virtue of its spectral absorbance, its concentration is easily tracked. Consequently, methylene blue is widely used as a redox indicator in analytical chemistry. Solutions of this substance are blue when in an oxidizing environment, but will turn colorless if exposed to a reducing agent. Due to its noticeable color, methylene blue is also often used in research as an indicator molecule for testing the effectiveness of organic molecule removal, because its concentration can be readily determined in situ by simple optical absorption.

Although generally harmless, ingestion of MB has several medical side effects apart from turning urine blue. These include causing hypertension, precordial pain, dizziness, headache, fever, nausea, vomiting, abdominal pain and anemia. Consequently, it is generally desirable to remove methylene blue from water and thus not only is concentration of this molecule easily monitored, but it is an organic, aromatic pollutant that it is desirable to destroy.

Low voltage, low energy submerged pulsed arcs were produced between both 99.5% carbon and with low carbon steel electrode pairs using the configuration of FIG. 1, with a pulse repetition rate of 100 Hz, energies of 2.6-192 mJ and pulse durations of 20, 50 and 100 microseconds to remove methylene blue contamination from 30 ml aqueous solutions.

One electrode was stationary, and had a 4 $cm^2$ plate work piece. The second electrode was a 4 mm diameter rod with a 28-degree conical tip. The second electrode was mounted on a vibrator, so as to periodically contact and separate from the first electrode plate, at a vibration frequency of 100 Hz, vibration amplitude of ~0.5 mm, for treatment times up to 5 min. The arcs were ignited by applying a voltage between the electrodes from a charged capacitor. A current pulse and plasma were produced during each contact-separation event. The energy stored in the capacitor was 192 mJ. The impact of the submerged pulsed arc treatment on the MB degradation $\ln(C_0/C_t)$ was measured as a function of processing time t, where $C_0$ and $C_t$ are, respectively, the methylene blue concentrations (determined by measuring the optical absorbance of the liquid at the peak methylene blue absorbance at a wavelength of 664 nm) initially and after treatment time t.

In addition to monitoring the methylene blue concentration in the solution by absorbance, the electrokinetic mobility and the zeta-potential were measured with a Zetasizer Nano ZS™ (Malvern Instruments Ltd., Malvern UK) and the pH of the solution before and after arc treatment was recorded at room temperature by a microprocessor based pH meter (pH—meter 2, Eutech Instruments, Thermo Fisher Scientific Inc., Waltham Mass. USA).

The experiment was repeated with low carbon (0.2%) steel electrodes. The 30 ml 10% methylene blue solution was treated by the arc (Fe/Fe electrode pair and W=192 mJ) as before for 0.5 min but then the treated sample was collected and filtered by a 0.45 micron filter (Whatman FP 30/045 CA-S, GE Healthcare, Little Chalfont UK) and the MB concentration was measured. Then, the filtered sample was again treated for a further 0.5, 1, 2 and 3 min, and after each treatment period, was again filtered.

The methylene blue concentration in 30 ml solution was found to decrease exponentially with rates of 0.0006-0.0143 $s^{-1}$ during processing with the carbon electrode pair.

With the low carbon steel electrodes, MB concentration initially decreased at a rate faster than that for the carbon electrodes but later saturated. Apparently, therefore, with iron or steel electrodes, the reaction becomes poisoned and it is believed that iron ablated from the electrodes interferes with the effectiveness of the reaction.

Figure 2:
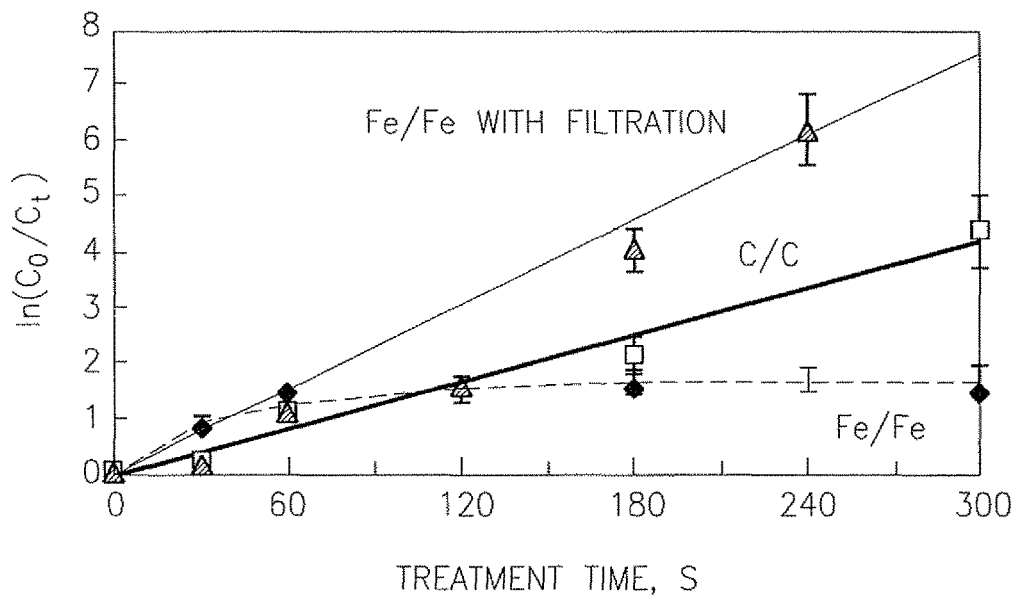
FIG. 2 shows $\ln(C_0/C_t)$ vs. treatment time for a C/C electrode pair and for Fe/Fe electrode pairs with and without filtering.

FIG. 2 shows the $\ln(C_0/C_t)$ vs. treatment time for both the Fe/Fe and the C/C electrode pairs where W=192 mJ and for the Fe/Fe electrodes with filtering.

With the C/C electrodes, the log of the degradation increased linearly with t up to $\ln(C_0/C_t)$=4.2 at t=300 s. With the Fe/Fe electrodes, the degradation proceeded more rapidly than with C/C during the first 60 s, and then saturated at $\ln(C_0/C_t)$=1.5. These curves illustrate the effectiveness of the C/C electrodes but show that although initially the use of Fe/Fe electrodes produces a higher decontamination rate, as seen in the initially high slope in the Fe/Fe curve, at later times the slope of the curve decreases to a very low value. However, it may be seen that with intermittent filtering, the decontamination continues with the same high initial slope for the entire tested period, which is approximately twice of what was obtained with C/C electrodes.

FURTHER EMBODIMENTS

One skilled in the art will appreciate that the invention describe above may be employed in various embodiments. In one embodiment, the treated liquid is continuously passed through a filter and returned to treatment vessel 11, with the sequence of submerged electrical arc discharge pulses applied continuously, until the desired level of decontamination is obtained. In another embodiment, the liquid is passed through a cascade of units, where each unit includes a treatment vessel with electrodes, actuator, generator, and filter, and the number of units and operating parameters of each unit are chosen so as to obtain the desired level of decontamination.

Without wishing to be bound by any particular theory, it is believed that the primary mechanism by which the submerged pulsed electrical arc discharge decontaminates water of organic molecule contaminants is by the production of active chemical species in the plasma bubbles produced by the submerged electrical arc pulses, and in particular, by generating OH. radicals. The OH. radical is a very active oxidant. We conjecture that submerged pulsed electrical arc discharge also probably produces $H_2O_2$ which is also an oxidant, but not as active as OH. radicals. and these active species are highly effective in attacking contaminant molecules, such as aromatics, and also the membranes of bacteria and other microbes. The rate of decontamination is determined by the concentration of these active species.

We conjecture that using iron-based electrodes to support the submerged pulsed electrical arc discharge results in the production of $Fe^{2+}$ ions, which undergo Fenton's reaction as follows:

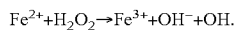

$$Fe^{2+}+H_2O_2 \rightarrow Fe^{3+}+OH^-+OH.$$

thereby serving as an additional source of OH. radicals.

Hence using the iron electrodes result, initially, in a higher concentration of the OH. radicals, and consequently in a higher decontamination rate, as seen in the higher initial slope of the Fe/Fe line in FIG. 2. However, the submerged pulsed electrical arc discharge produces small iron-based particles typically having a size in the order of microns or nanometers. These particles may be produced directly by arc erosion of the liquid electrode material melted by the arc or from the evaporation of Fe from the iron-based electrode and its subsequent condensation in the form of nano-particles. Such nano- and microparticles accumulate in suspension in the liquid, and it is believed that they scavenge active chemical species significantly reducing the active species concentration, so that the decontamination rate as evidenced by the slope of the Fe/Fe curve in FIG. 2 drops off over time.

In the present invention, exposure to the submerged arc is coupled with filtering to remove these macro- and nano-particles. It is believed that this allows the active species concentration, aided by Fenton's reaction, to remain high, and consequently a high decontamination rate is maintained throughout the treatment period, as evidenced by the uniformly high slope of the "Fe/Fe with filtering" curve in FIG. 2.

It will be appreciated that the length of time that the submerged arc operates, the type of filter and the filtering period, the electrode geometry and the current and voltage characteristics of the submerged arc are variables under control of the operator and may be set to optimize specific applications. Although the submerged arc discharge and the filtering are described above as being applied in an alternating fashion, it will be appreciated that in some embodiments they may operate concurrently.

Although the preferred system described hereinabove comprises a stationary electrode and one vibrated electrode, it will be appreciated that both electrodes may be stationary. Alternatively both electrodes may be vibrated electrodes.

In the experimental proof of concept low carbon steel electrodes were used, their greater rate of reaction until the build up of ablated material was noted, as was filtering to remove the ablated material. There are, in practice, a wide range of iron based electrode materials, and the electrodes may be cast iron, low carbon steel or other steels.

One skilled in the art will appreciate that the invention described above may be employed in various embodiments. In one embodiment, the treated liquid is continuously passed through a filter and into treatment vessel, with the sequence of submerged electrical arc pulses applied continuously, until the desired level of decontamination is obtained. In another embodiment, the liquid is passed through a cascade of units, where each unit comprises a treatment vessel with electrodes, actuator, generator, and filter, and the number of units and operating parameters of each unit are chosen so as to obtain the desired level of decontamination.

The scope of the present invention also includes a method of removing contaminant molecules from water, in which, to give a preferred example, 0.01-0.5% of $H_2O_2$ is added to the water, the $H_2O_2$—water solution is exposed to a submerged pulsed electrical arc discharge sustained between Titanium electrodes, aged, and then treated by sedimentation aided by the addition of a coagulating agent that changes the pH of the water.

A contaminated liquid sample 101 to be treated, with the addition of sufficient $H_2O_2$ from a dispenser 110 to yield a concentrtion of 0.01-0.5% $H_2O_2$ in liquid sample 101, is placed in a suitable vessel 111. A pulsed arc discharge 102 is produced between surface 131 of a stationary electrode 103, and a vibrated electrode 105, where both electrodes are made from Titanium (Ti). The electrical pulses used to sustain the arc discharge are produced by a pulse generator 104. In a preferred embodiment illustrated here, the mechanism to ignite the discharges is axial motion of electrode 105 with respect to surface 131 by actuator 106. Electrode 105 periodically makes contact, and quickly breaks contact with surface 131. Current starts to flow when (or slightly before) electrode 105 contacts surface 131, and the current continues flowing through the arc plasma which is created when the contact is broken. With appropriate pulse parameters and materials, the arc produces plasma that includes material from electrodes 103 and 105 and the surrounding liquid 101. Part of the plasma condenses in liquid sample 101 in the form of micro or nano-particles 107. Pulsed arc discharge 102 is ignited between electrodes 103 and 105, and is periodically repeated at a pre-selected repetition rate and for a pre-determined period of time $T_p$. After $T_p$, the treated liquid sample 112 is fed into a vessel 113 for aging. The aging time $T_a$ is continued as long as needed to reach a desired decontamination level. Then, after $T_a$ a coagulating agent 108 is fed into vessel 113 to change the pH of the liquid therein. As a result, the nanoparticles 171 coagulate and sedimentate. The coagulating agent is chosen experimentally, according to the type of treated liquid sample and the nanoparticles contained in the treated liquid sample, so as to change the zeta potential of the liquid sample to a value close to 0. $H_2SO_4$, NaOH, aluminum sulfate, polyaluminum chloride and polyaluminium sulfate, ferric chloride, ferric sulfate and ferric chloride sulfate may be used as coagulating agents. Coagulation and sedimentation time $T_{cs}$ is chosen experimentally in order to optimize results. Purified liquid 114 is fed into a vessel 115.

The pulse generator may be DC or AC. The pulse parameters (e.g. peak current, waveform, pulse duration, repetition frequency) can be varied over a wide range. Such variation will generally influence the level, rate and yield of contaminant molecule removal.

Figure 4:
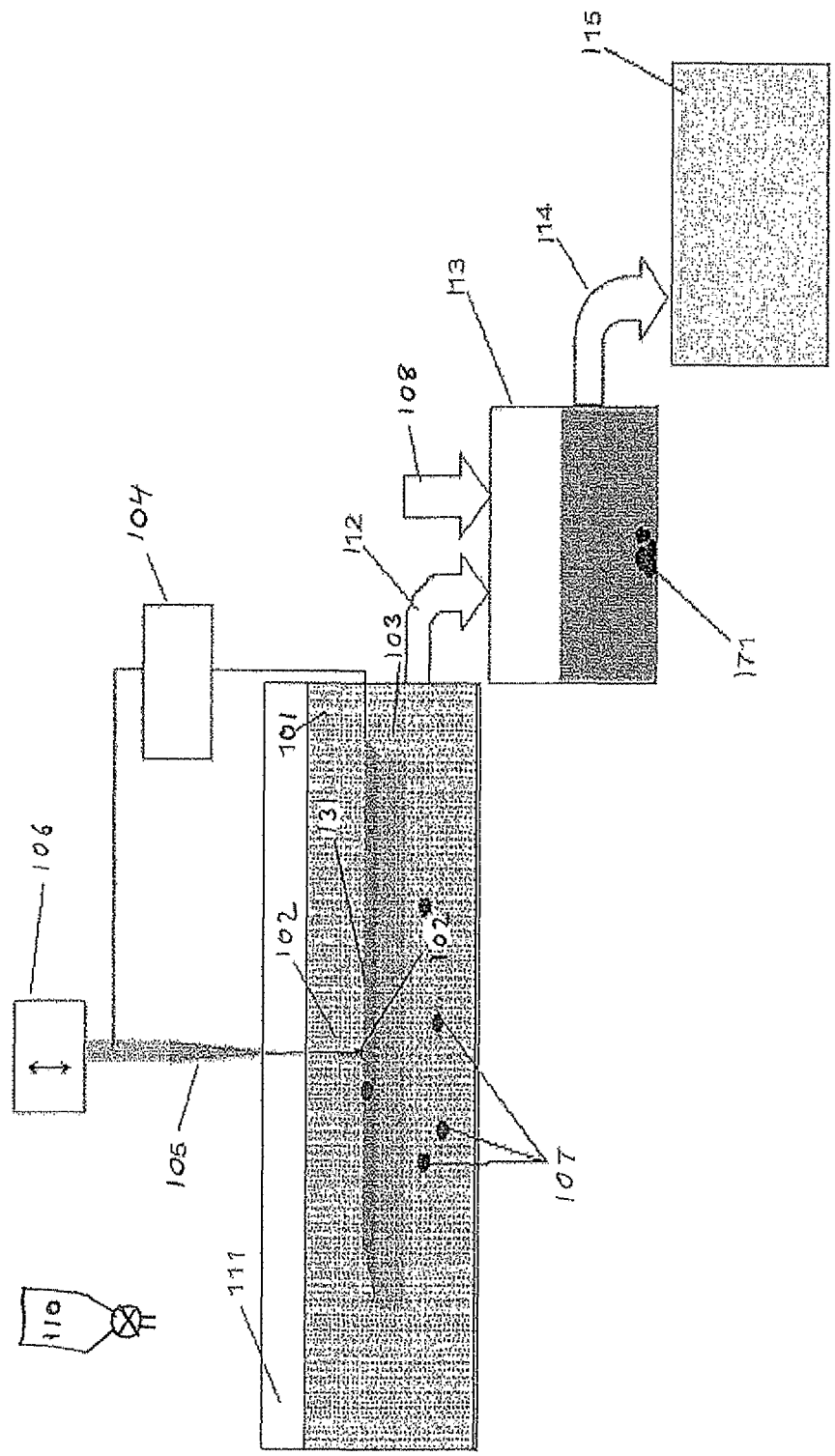

This embodiment of the invention can be illustrated by an example. Pulsed arcs were applied between two 99.5% titanium electrodes (referred to as Ti/Ti). The electrodes were submerged in 40 ml water with dissolved methylene blue contaminant (10 mg/l) and 0.5% $H_2O_2$ and treated with the apparatus illustrated in FIG. 4. One electrode was a stationary 4 cm² plate. The second electrode was a 4 mm diameter rod with a 28-degree conical tip. The second electrode was mounted on a vibrator, so as to periodically contact and separate from the first electrode plate, at a vibration frequency of 100 Hz, vibration amplitude of ~0.5 mm, for a processing time of $T_p=1$ min. The arcs were ignited by applying a voltage between the electrodes from a charged capacitor. A current pulse and plasma were produced during each contact-separation event. The energy stored in the capacitor was W=7.5 mJ. The impact of the submerged pulsed arc treatment on the methylene blue degradation $\ln(C_0/C_t)$ was considered as a function of treatment time $T_t=T_p+T_a$, where $C_0$ and $C_t$ are, respectively, the methylene blue concentrations (proportional to the height of the absorbance peak at 664 nm) initially and after time $Tt_t$. $\ln(C_0/C_t)$ vs. $T_t$ shown in FIG. 5. The methylene blue concentration decreased only about 7% after $T_p=1$ min.

Figure 5:
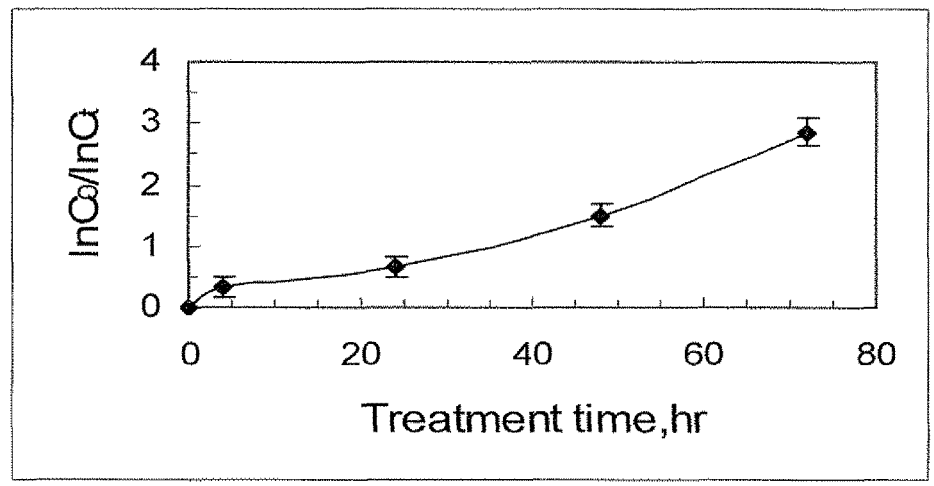
FIG. 5 shows $\ln(C_0/C_t)$ for the removal of methylene blue from water using the system of FIG. 4.

As can be seen in FIG. 5, after 75 hr of $t_t$, $\ln(C_0/C_t)$ reached 3, equivalent to more than 95% methylene blue removal. The energy expended during the treatment time was 45 J ($1.25 \times 10^{-5}$ kW-hr) and the required energy per unit volume was J=0.315 kW-hr/m³.

The coagulating agent influence was tested with a Zetasizer Nano ZS. Addition of $1.125 \times 10^{-3}$M $H_2SO_4$ decreased the pH from 3.5 to 1.8 and the nanoparticles were precipitated from the solution during 4 hours as result of nanoparticles coagulation. Addition of $6.25 \times 10^{-5}$M NaOH increased the pH from 3.5 to 4.2, and decreased the mean diameter of the nanoparticles remaining in the solution by a factor of 2 for the same $T_{cs.}=4$ hours.

Increasing the pulse energy decreased the treatment time and the aging time required to obtain the same (95%) removal level. By using a pulse energy of 22.7 mJ during a treatment time of 1 min, the aging time decreased to 18 hr. The required energy per unit volume was J=0.94 kW-hr/m³ in this case. On the other hand, decreasing the pulse energy increased the treatment time and the aging time needed to achieve the same contaminant removal result. Thus, when the pulse energy was 2.5 mJ, a treatment time of 5 min, and an aging time of 72 hr were needed to obtain 95% MB removal, i.e. the aging time was at least two orders of magnitude greater than the treatment time. The required energy per unit volume was J=0.54 kW-hr/m³ in this case.

The effectiveness of different treatment methods for removing methylene blue [M. A. Malik, "Water Purification by Plasmas: Which Reactors are Most Energy Efficient?", *Plasma Chem Plasma Process* (2010) 30:21-31] is compared with effectiveness of the instant method in FIG. 6 using the yield per expended energy needed for 50% methylene blue removal as the measure for comparison. The condition of 50% conversion was selected for two reasons: (a) maximum data is available for this conversion, and (b) analysis errors, or interference from intermediates may not be negligible at >50% conversion [M. A. Malik, "Water Purification by Plasmas: Which Reactors are Most Energy Efficient?", *Plasma Chem Plasma Process* (2010) 30:21-31].

Figure 6:
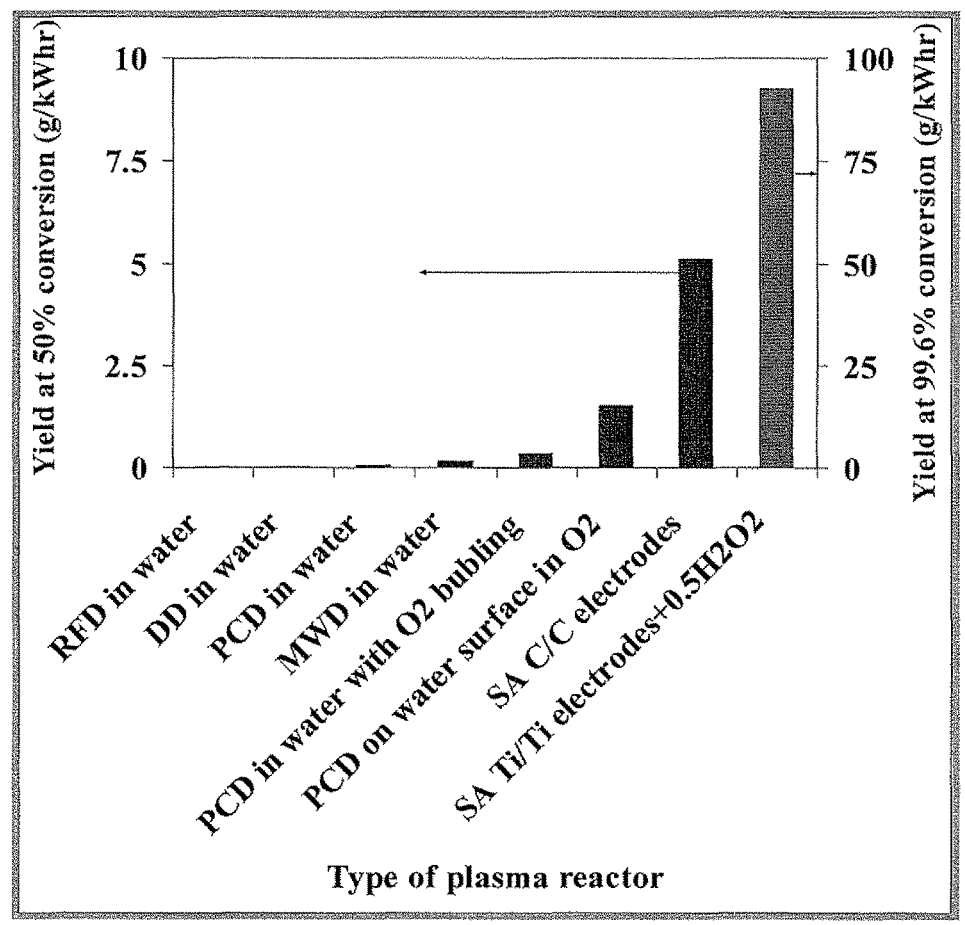
FIG. 6 compares the methods of the present invention to conventional methods.

FIG. 6 compares the energy efficiency of the present invention to conventional plasma treatments of contaminated water [M. A. Malik, ibid.]: radio frequency discharges (RFD), diaphragm discharges (DD), pulsed corona discharges (PCD) in different combinations and microwave discharges (MWD). It may be seen in FIG. 6 that using the submerged pulsed electrical arc discharge treatment with Ti electrodes and the addition of 0.5% $H_2O_2$ according to the present invention produced a value of $G_{99.6}$ (the volume of treated water per unit energy expenditure at 99.6% degradation of methylene blue) which was 18 times larger than the value of $G_{50}$ (the volume of treated water per unit energy expenditure at 50% degradation of methylene blue) obtained using submerged pulsed electrical arc discharge treatment with carbon electrodes (the C/C experiment described above), and more than 60 times larger than obtained with other plasma methods [M. A. Malik, ibid.].

Particles of most metals tend to react with water to form oxides on their surfaces.

The effect of these surfaces on the removal of contaminants by pulsed submerged arc electrical discharges varies from metal to metal. As described above, the oxide surface ($Fe^{+++}$) on iron particles tends to scavenge the species that destroy the contaminants, thereby inhibiting the destruction of the contaminants. It is believed that, in the titanium-electrode-plus-hydrogen-peroxide embodiment of the present invention, the titanium dioxide surfaces of the titanium particles react with the hydrogen peroxide to produce titanium peroxide, which is in turn a source of strongly oxidizing radical species that destroy the contaminants. It is well within the ability of one ordinarily skilled in the art to determine experimentally, for electrodes of any given metallic composition, whether the particles produced from the electrodes by pulsed submerged electrical arc discharges promote or inhibit the destruction of contaminants in the liquid in which the electrodes are submerged.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method of removing a contaminant from a liquid comprising the steps of:
    (a) effecting a first pulsed electrical arc discharge between a first and a second electrode immersed in the liquid for a first period of time, thereby creating a plurality of first particles within the liquid;
    (b) pausing said first pulsed electrical arc discharge for a second period of time thereby allowing the liquid and the plurality of first particles to age, said second period of time at least two orders of magnitude greater than said first period of time;
    (c) removing at least a portion of said plurality of first particles from the liquid after said second period of time; and
    (d) effecting, subsequent to said pausing and said removing, a second pulsed electrical arc discharge between either the first and the second electrode, or a third and a fourth electrode, immersed in the liquid for a third period of time, thereby creating a plurality of second particles within the liquid.

2. The method of claim 1, wherein at least one of said first and second electrodes is a metallic electrode.

3. The method of claim 2, wherein said metallic electrode includes iron.

4. The method of claim 2, wherein said metallic electrode includes titanium.

5. The method of claim 1, wherein said effecting of a pulsed electrical arc discharge includes vibrating one of said first and second electrodes.

6. The method of claim 1, wherein said removing is effected by filtering the liquid.

7. The method of claim 6, wherein said filtering is effected by at least one of:

(i) filtering through a filter having a pore size of between about 0.2 microns and about 0.8 microns,
(ii) filtering through sand,
(iii) filtering via a flotation filter, and
(iv) filtering via an electro-flotation filter.

8. The method of claim 1, further comprising:
(e) pausing said second pulsed electrical arc discharge for a fourth period of time thereby allowing the liquid and the plurality of second particles to age, said fourth period of time at least two orders of magnitude greater than said third period of time.

9. The method of claim 8, further comprising repeating steps (a) through (d) until a concentration of the contaminant in the liquid falls below a predetermined level.

10. The method of claim 1, further comprising:
adding an oxidizer to the liquid before pausing said first pulsed electrical arc discharge.

11. The method of claim 1, further comprising:
adding an oxidizer to the liquid before effecting said first pulsed electrical arc discharge.

12. The method of claim 10, wherein said oxidizer includes hydrogen peroxide.

13. The method of claim 12, wherein a sufficient amount of said hydrogen peroxide is added to the liquid to produce a concentration of said hydrogen peroxide, in said liquid, between about 0.01% and about 0.5%.

14. The method of claim 1, wherein said removing comprises adding a coagulant to the liquid.

15. The method of claim 1, wherein each pulse of said first pulsed electrical arc discharge has an energy of between about 0.1 mJ and about 1000 mJ.

16. The method of claim 15, wherein each pulse of said first pulsed electrical arc discharge has an energy of between about 2.5 mJ and about 22.5 mJ.

17. The method of claim 1, wherein each pulse of said first pulsed electrical arc discharge has a duration of between about 0.1 microseconds and about 100 microseconds.

18. The method of claim 1, wherein a frequency of first said pulsed electrical arc discharge is between about 1 Hz and about 10 KHz.

19. The method of claim 18, wherein said frequency of said first pulsed electrical arc discharge is between about 100 Hz and about 10 KHz.

20. The method of claim 1, wherein said first pulsed electrical arc discharge is effected at a voltage of between about 30 V and about 400 V.

21. The method of claim 1, wherein said first pulsed electrical arc discharge is effected at a current of between about 1 A and about 500 A.

22. The method of claim 1, wherein said first and second electrodes are in a first treatment vessel and said third and fourth electrodes are in a second treatment vessel.

* * * * *